(12) United States Patent
Chang et al.

(10) Patent No.: US 7,983,961 B1
(45) Date of Patent: Jul. 19, 2011

(54) METHODS AND APPARATUS FOR MARKETING PROFILING WHILE PRESERVING USER PRIVACY

(76) Inventors: Alvin Chang, Oakland, CA (US); Rocky Kahn, Oakland, CA (US)

( * ) Notice: Subject to any disclaimer, the term of this patent is extended or adjusted under 35 U.S.C. 154(b) by 1279 days.

(21) Appl. No.: 11/553,247

(22) Filed: Oct. 26, 2006

Related U.S. Application Data

(60) Provisional application No. 60/801,156, filed on May 17, 2006, provisional application No. 60/596,872, filed on Oct. 27, 2005.

(51) Int. Cl.
*G06Q 30/00* (2006.01)
(52) U.S. Cl. .................................................... 705/26.7
(58) Field of Classification Search .................. 705/26, 705/27, 26.7
See application file for complete search history.

(56) References Cited

U.S. PATENT DOCUMENTS

| | | | |
|---|---|---|---|
| 6,327,574 B1 | 12/2001 | Kramer et al. | |
| 6,633,852 B1 | 10/2003 | Heckerman et al. | |
| 6,654,725 B1 | 11/2003 | Langheinrich et al. | |
| 6,804,659 B1 | 10/2004 | Graham et al. | |
| 6,839,680 B1 | 1/2005 | Liu et al. | |
| 6,847,992 B1 | 1/2005 | Haitsuka et al. | |
| 6,850,988 B1 | 2/2005 | Reed | |
| 6,886,101 B2 | 4/2005 | Glazer | |
| 2002/0055912 A1 | 5/2002 | Buck | |
| 2002/0111994 A1* | 8/2002 | Raghunandan | 709/203 |
| 2002/0120519 A1 | 8/2002 | Martin et al. | |
| 2002/0147638 A1* | 10/2002 | Banerjee et al. | 705/14 |
| 2003/0135490 A1* | 7/2003 | Barrett et al. | 707/3 |
| 2003/0222134 A1 | 12/2003 | Boyd | |
| 2004/0059708 A1* | 3/2004 | Dean et al. | 707/1 |
| 2005/0131894 A1 | 6/2005 | Vuong | |
| 2005/0149398 A1* | 7/2005 | McKay | 705/14 |
| 2005/0240580 A1 | 10/2005 | Zamir et al. | |
| 2006/0080265 A1* | 4/2006 | Hinds et al. | 705/400 |

OTHER PUBLICATIONS

Tehrani, Nedji, "Business in the telemarketing capital of the world," Jan. 1994, Telemarketing Magazine, vol. 12, No. 7, p. 42, 55.*

* cited by examiner

*Primary Examiner* — Jeffrey A Smith
*Assistant Examiner* — Brandy Zukanovich
(74) *Attorney, Agent, or Firm* — Priest & Goldstein, PLC

(57) ABSTRACT

Techniques are described for collecting user descriptive data as a user employs a client device, such as a personal computer, laptop, PDA, or the like. The data is evaluated and a profile code is assigned based upon the evaluation. This profile code is selected from a domain of profile codes established so that useful markets for targeted advertising are identified by the profile codes, but the profile codes are not so specific that the user's privacy is unduly threatened.

20 Claims, 4 Drawing Sheets

METHODS AND APPARATUS FOR MARKETING PROFILING WHILE PRESERVING USER PRIVACY

RELATED U.S. APPLICATIONS

The present application claims the benefit of U.S. Provisional Application No. 60/596,872 filed Oct. 27, 2005 and U.S. Provisional Application No. 60/801,156 filed May 17, 2006 which are incorporated by reference herein in their entirety.

FIELD OF THE INVENTION

The present invention relates generally to the efficient delivery of electronic content over a network and, more specifically, to techniques for targeting such content to particular user's psychographic, demographic, or other interests while preserving user privacy.

DISCUSSION OF PRIOR ART

Web marketing is capturing an increasing share of the advertising market. A targeted advertisement, taking into account, for example, the recipient's demographic, psychographic, or other details, can increase response rate. An increased response rate as a result of appropriate targeting provides increased value to the advertiser and may reduce recipient annoyance with inappropriate advertising. For example, a seventy year old male might actually want to receive a Viagra advertisement or coupon, but probably isn't interested in ads for baby formula. Conversely, a nursing mother could have an opposite view of those same two ads.

Approaches for targeted advertisement can include an application running on a client's computer. One approach involves the client application monitoring user-computer interactions to collect data describing the user's identity and selected personal characteristics. This data is collected in a user profile. When a user launches a search in a browser, a search query issued via the browser is adjusted according to the user's profile. Relevant terms from the user profile may be added to the search query with associated weights. These terms can be used to improve search results as well as improve the accuracy of targeted advertisements.

There are variations on this approach for generalized web page browsing where the client application uploads relevant terms from the user profile when visiting participating sites, allowing targeted advertising to be displayed. A drawback to these approaches is that identifying information about the user, for example the relevant terms added to the search query or uploaded to a website, are shared with unknown parties while offering the user little control over what usage data is collected or how that data is used. Users are hesitant to divulge such potentially personally-identifying information.

There are various approaches for users sharing information without divulging too detailed information about themselves. An approach that limits sending identifying information to servers is the client ad-filtering approach. Under this approach, a potentially large set of advertisements (adverts) are sent to the user. A profiler engine on the user's client device selects the most relevant adverts. Such selection or filtering is driven by a user profile. However, the client-ad filtering approach can have a number disadvantages. It has large bandwidth requirements, which may be particularly relevant for mobile devices. It can have low auditing capability for advertisers. Due to privacy concerns, marketing firms are prevented from knowing which adverts were viewed. Another disadvantage concerns users who access the Internet from multiple machines, for example, a laptop and a desktop, who would welcome access to their personalized browsing experience from whatever computer they use, but prior techniques for client-side filtering are usually driven by a large encrypted user profile database which is not easily copied.

The approaches described above are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF THE INVENTION

Among its several aspects, the present invention recognizes there is a need for an approach or mechanism to increase advertisement relevancy to a client that avoids the disadvantages attendant to the above mentioned approaches.

According to one aspect of the invention, a method is provided which comprises collecting user-descriptive data about a user at a client; evaluating said user-descriptive data by said client; based on said evaluation, determining by said client at least one profile code from a domain of profile codes, each profile code of said domain of profile codes identifying a market segment for targeted content; transmitting said profile code from the client via a network to a server, said profile code causing said server to generate targeted content based on said profile code; and receiving said targeted content customized to said profile code at said client. The above method may further comprise collecting user descriptive data including at least one of the following: recording user browser interactions; tracking search terms input by said user for search queries; storing user demographic data collected by the user; or tracking purchases made by the user.

Another aspect addresses a machine-readable medium carrying one or more sequences of instructions which, when executed by at least one processor, cause the at least one processor to perform steps comprising: said client evaluating said user-descriptive data; based on said evaluation, said client determining at least one profile code from a domain of profile codes, each profile code of said domain of profile codes identifying a marketing segment for targeted content; said client transmitting via a network to a server from a set of servers said profile code to cause said server to generate targeted content based on said profile code; and said client receiving said targeted content generated based on said profile code.

A further aspect addresses a method is provided which comprises collecting user-descriptive data about a user at a client; evaluating said user-descriptive data by said client; based on said evaluation, determining by said client at least one profile code from a domain of profile codes, each profile code of said domain of profile codes identifying a market segment for targeted content; transmitting from said client via a network to a server from a set of servers said profile code; in response to said profile code, said set of servers generating targeted content based on said profile code; and receiving said targeted content generated based on said profile code at said client.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
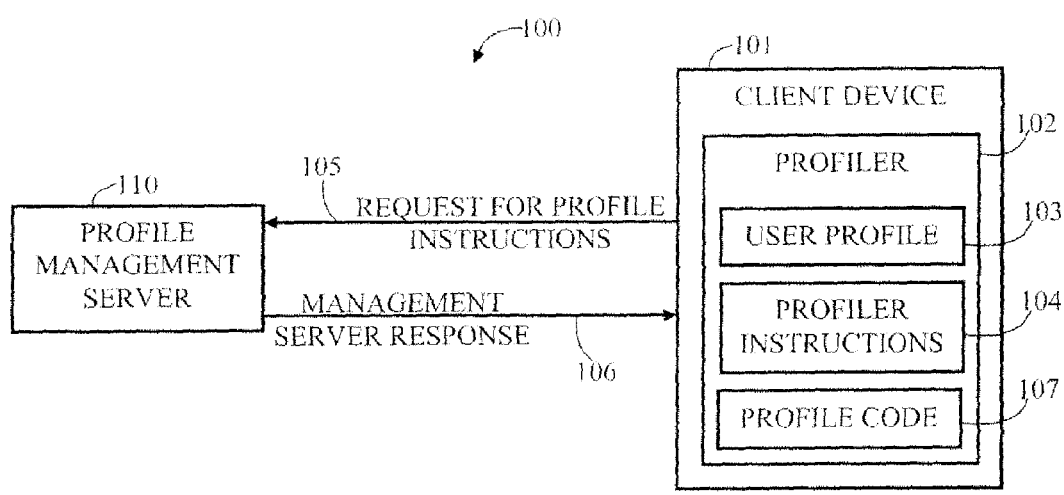
FIG. 1 illustrates a system for targeted advertisement that uses non-identifying descriptive data according to an embodiment of the present invention.

In the following description, for the purposes of explanation, numerous specific details are set forth in order to provide a thorough understanding of the present invention. For example, the following description describes how a consumer browsing websites on a personal computer may receive advertisements targeted to his or her demographic or psychographic profile while minimizing the personalty-identifying details provided to others. It will be apparent, however, that the present invention may be practiced without these specific details. The action of browsing websites may be generalized to accessing information over a digital network. Likewise, targeted advertisements may be generalized to any form of targeted content. The particularly described profiles may be modified as desired or replaced by other profiles to meet the needs of both advertisers and users.

In an embodiment of the present invention, each consumer is identified by a segment descriptor label which characterizes and classifies said consumer into one or more market segments. Depending on the context, these labels may describe segments including potential customers with propensities to purchase particular classes of products or services, segments likely to offer increased attention to certain types of content, the like segments likely to respond to certain media types with different click patterns, or the like.

One way to accomplish this identification by market segments is to collect a variety of information about users who access servers on the web, to analyze and evaluate the information collected on the servers, and to classify the users into market segments. Each segment may then be denoted with a segment descriptor label that is associated with a user or client which the user uses to access the server. Note that the use of the term segment means that one segment descriptor label is chosen from a list of segment descriptor labels. Thus, there is a domain of possible segment descriptor labels. If this domain is very large, such a technique can divulge an unacceptable amount of the data. For example, if the domain of segment descriptor labels consists of a large number of segment descriptor labels, the user may view the label as akin to a personally-identifiable tag by which he or she can be tracked. Even if the domain of segment descriptor labels is smaller, the user may feel his or her privacy is being compromised. For example, if there are 300,000,000 Internet users and a domain of 100,000 segment descriptor labels, users would be grouped into segments averaging 3,000 people which might be considered to provide reasonable measure of privacy. However, it would be likely some segments would have fewer people, and consequently, such a large domain of segment descriptor labels is more likely to allow distinctions which are, to the consumer, undesirably fine grained. It is therefore desirable to tag users with segment descriptor labels which provide significant value to the content providers while users are maintained in groups with large enough populations and coarse enough segment descriptor labels to preserve the user's perception of anonymity.

Techniques are described herein that reduce the identifying and personally-characterizing nature of segment descriptor labels that are exposed to servers. Such segment descriptor labels are chosen from a small enough domain of segment descriptor labels to prevent identification or an overly fine grained description for a majority of users. Such labels, neither uniquely identifying the user nor describing the user with discomfort causing specificity, are hereafter referred to as non-identifying segment descriptor labels. For example, if the domain of segment descriptor labels applied to a population of say. 300,000,000 Internet users consists of 100 possible labels, a user's privacy is assured because a user will, on average, be a member of a group of 3,000,000 users. Even with 1,000 labels, a user's privacy would not be compromised because a user will, on average, be a member of a group of 300.000 users. Such a small domain of possible segment descriptor labels is necessarily coarse and therefore unlikely to describe users with an undesirable level of detail.

A non-identifying segment descriptor label chosen from a domain of non-identifying segment descriptor labels can be represented by an index into the domain. This index is called a profile code. Such an index may be represented as an integer number, representing the selection of a particular segment descriptor label. Provided that the domain of non-identifying segment descriptor labels is available to all relevant parties, a non-identifying segment descriptor label is then interchangeable with a profile code. Henceforth, unless a distinction is made explicitly, the terms "non-identifying segment descriptor labels" and their corresponding "profile codes" shall be used interchangeably in this specification.

In one embodiment of the present invention, the domain of possible segment descriptor labels numbers one hundred, represented by integers between 0 and 99, and the application running on the client's computer provides only the client's profile code to the content providers. If the domain of non-identifying segment descriptor labels is chosen carefully, such a profile code is sufficient to allow content providers, such as advertisers, to target advertisements in a meaningful and effective way. For example, profile code 33 might represent a "retired male conservative residing on the West Coast".

FIG. 1 depicts a system 100 for targeted advertisement that uses non-identifying segment descriptor labels according to an embodiment of the present invention. The system 100 is shown with a client device 101, such as a personal computer (PC), a notebook computer, a handheld computer, a portable data assistant (PDA), or the like and a profile management server 110. A profiler 102 may be suitably embodied as a software application that runs on the client device 101 and may be embedded in a browser implementation on the client or embedded as a browser plugin which monitors the http stream. The profiler 102 may be part of a library of code that is linked into an application which watches browser and Internet connections through the operating system. The profiler 102 may act as a proxy application in the operating system that modifies browser and Internet connections and supports attachments of code into an http request. The profiler 102 may also be a proxy server in between the browser and the website. Among other functions and tasks it performs, the profiler 102 may collect user descriptive data, which may include search queries submitted by the user, links from or to the documents identified by the queries, sampled content from pages accessed via the web browser, time spent on each page, purchase transactions, as well as personal information implicitly or explicitly provided by the user, for example, via questionnaires. The profiler 102 stores the collected user descriptive data in a user profile 103.

Profiler 102 then evaluates the user descriptive data stored in the user profile 103 to produce at least one profile code 107. This evaluation involves a reduction of a larger set of user descriptive data, such as the record of browser interactions and user demographic data, to a smaller set of data or a datum. According to an embodiment of the present invention, such a smaller set of data or datum is a profile code 107. The profile code 107 may be, for example, an integer between the range 0 and 99, each integer in the range representing a classification, such as a marketing segment and its defining user demographic, psychographic, or other profile.

Profiler instructions 104 are instructions applied by profiler 102 to analyze and evaluate the user profile 103 to generate the at least one profile code 107. These profiler instructions 104 may include rules associating user demographic psychographic, or other profiles with classifications, such as marketing segments, and further associated with, for example, visits to particular uniform resource locators (URLs) and demographic profiles.

Since the profiler software will reduce the user profile 103 down to at least one profile code 107, the data structure of the user profile 103 may comprise a number of "bins" equal in number to the "domain" of the profile code 107, for example, bins 0-99 for a two-digit profile code. Each bin might contain a chronologically ordered list of related events. Each event might consist of a date and a relevance or confidence weighting factor from 0.0 to 1.0. For example, if a user browses a web page which discusses features of cars, an event including that date and a medium weighting factor would be recorded in a bin corresponding to a profile code for buying a car. On the other hand, if the user browses a website where advertisements for cars are listed, the weighting factor would be higher. Note that a browsing interaction may produce multiple events. For example, browsing a webpage containing a review of Cadillac automobiles may create an event in the buying car bin with a medium weighting factor and another event in the age 40-60 bin with low weighting factor, based on a weighting rule that associates reading about Cadillacs with a middle-aged user.

The profile instructions 104 would apply a series of tests to semantically parse text on web pages the user visits and/or to compare URI's and keywords against matches for each of the bins. For example, if there is a bin associated with a profile code 107 for a user who buys books, the profiler instructions 104 may specify that each ten-minute period where the user visits a used book website would generate an event with an attached weighting factor of 0.7 to the bin representing tendency to buy books. Another rule in the profile instructions 104 may cause text on a book's description to be parsed, such as when a user visits the used book website and discovers a book description having a codeword "puppy", an event would be generated with a weighting factor of 0.2 in a bin associated with users who are animal lovers.

For example, with a user profile 103 as described above, the profile code 107 may be suitably calculated by the following exemplary techniques. The profile instructions 104 may specify a "decay rate" which might represent a "weighing factor half-life" specified in units of days. For example, if the half-life is specified as 30 days, then an event's weighting factor would be divided in half every 30 days. The profile instructions 104 may include a "weighting factor threshold" specifying that when a given weighting factor falls below a certain threshold, the event would be deleted. A profile code 107 may be calculated by summing the weighted events in each bin to provide a summed event weighting factor for each bin and choosing the profile code 107 corresponding to the bin with the highest summed event weighting factor.

The profiler 102 operation is determined, at least in part, by a rule set. An initial rule set may be bootstrapped from the browser/plugin/proxy from a URL embedded in the profiler code. The initial set of rules may also be embedded in a download setup of the client device 101 or loaded from a media device such as from an optical disk or flash RAM. The initial set of rules may also include rules for how to receive updates. The updates may come through a web request, loaded off of a client device 101 from a specific location, or through any communication channel or media device available to an application or operating system.

The profiler 102 may define a set of accumulators to count events which are visible in the browser stream that represent a condition worth tracking. The profile code 107 may be computed based on values obtained from one or more accumulators. This process may produce multiple profile codes 107 which, based on a rule, may determine one or a predetermined number, such as the top three, for example, scoring profile codes. The profiler 102 may determine a single profile code 107 or concatenate a top grouping of profile codes.

An exemplary set of commands that may comprise a suitable rules database is listed in the following table:

| Command | Description |
| --- | --- |
| TIMEINTERVAL[seconds] | Specifies when the accumulators are reset |
| RULELOCATION[location] | Specifies a location online, a URL, or on the local file system to look for rules and updates |
| COUNT[accumulator name], [condition], [condition arguments], [target list] | The specified accumulator counts a [condition] based on optional [condition arguments] |

In the following text, an exemplary set of [condition] specifications from the COUNT command listed in the above table are briefly described. The exemplary set of conditions which may be counted comprises [visits] for sites visited, [cookieexists] for existence of a cookie, [videoonpage] for video available, [headerexists] for example, content-type=zml, for a document returned that is an xml document, [searchquery] for "mortgage", "loan", "cancer" for a document returned contains these search queries, [visitedwithget] for site visited with a "GET" request, [visitedwithpost] for sites visited with a "POST" request, and [containswords], for example, [skiing], [vacation] for a document returned contained the words "skiing", and "vacation.". The [condition argument] is used for selected conditions, for example, for the condition [visits], the [condition argument] may be a site, such as, amazon.com walmart.com, or skiing.com or a combination of the listed sites. It is noted, that this exemplary listing is only a partial listing. Definitions may be added for types of activity generated by an HTTP client including time spent on pages, local machine statistics, and the like. Profiler [conditions] in the rules database may all be defined at run-time on each page request or pre-defined in the profiler's application code, or a combination of the two.

The [targetlist] is a list of potentially matching URIs specified as an entire domain, such as, amazon.com, a specific base address, such as, www.amazon.com, a URI matching a regular expression, such as, *.*ama*.com. or a list of multiples of the above. Further a [targetlist] may also be a URI which points to a list. For example, an HTTP request which matches a regex. A regex or a regular expression is a string that describes or matches a set of strings, based on specified syntax rules. Regular expressions may be used to search text for certain patterns. Many programming languages also support the use of regular expressions. As another example, an HTTP request with a header field whose value matches a regex may trigger an event. A [targetlist] may also be used to determine when to return a profile code. An optional arument may be specified for each [targetlist] which specifies the method of returning the profile code.

The profiler 102 may be further extended by adding a computer language interpreter into the client to support dynamically adding custom conditions to the profiler 102. Due to the flexibility provided by an embedded language interpreter, complex conditions may be constructed based on details derivable from a document's content, headers and available data in the profiler's memory space. For example, complex conditions may be constructed for matches on word patterns in pages, page segments, and headers. System information may also be accumulated provided it can be specified in a condition. Implicit and explicit indicators of user behaviors may be tracked where the indicators are based on HTTP request/response cycles and external data available to the profiler 102. Also, by using an interpreter language to specify the [condition], accumulators may be generated for arbitrarily complex conditions.

A client device 101 may be used by different users having personalized browsers. A profiler 102 operating on such a client device may have rules which are ignored by particular client users. For example, a condition identifying a bookmark on one browser for one user may be ignored for a different user having a different personalized bookmark. A common rules database may still be used, but commands, for example, based on a personalized bookmark, may be ignored or tracked depending upon the browser in use that is associated with the user operating the client device 101.

A language interpreter may be embedded in the client device 101 profiler 102 which allows profile code 107 calculations to be defined using program code that is evaluated at runtime. The language interpreter may be written in modern computer languages, for example, but not limited to javascript, C Java, Ruby, FORTRAN, Pascal, Perl, or the like. Profile code 107 calculations are done by standard mathematical operators, such as, ADD, MULT, SUB, GT, LT, EQ, DEFINED, NOT DEFINED, AND, OR, and looping constructs, such as, FOR, WHILE, and conditionals, such as, IF, and THEN. The following example, illustrates a simplified process to calculate a set of three profile codes 107.

```
A1    # of times automobile sites visited
A2    # of times shopping-related sites visited
A3    # of visits on news sites
A4    # of times an item is added to shopping cart on shoppim; sites
A5    # of times the term "ear" was typed into a search engine
A6    # of times the term "Cadillac" was typed into a search engine
A7    # of search engine requests
Profile code 1 = (A1/A7) * 200 + (A6/A1) * 400
Profile code 2 = (A2/A7) * 300
Profile code 3 = {
        If ((A5/A7)>3%) Profile Code 3 = Profile Code 3 + 1000
        If (A4>10) Profile Code 3= Profile Code 3 + 500
        }
Return highest score (Profile Code 1, Profile Code 2, Profile Code 3)
```

In another embodiment of the present invention, the profiler 102 may store a chronologically-ordered list of browser interaction events on a client device 101 without attempting to immediately categorize or interpret them. For example, the user profile 103 may store the URL's which are visited and cache the contents of the web pages. By integrating the user profile 103 in a browser, the user profile 103 may make use of a browser's cache or a user profile cache may be more optimally implemented and used, independent of the browser. When the user profile cache is full, the least recently accessed web pages would generally be discarded. If the cache size, in a particular implementation, is insufficient to capture web site interactions as far hack as desired, captured events may be "compressed" by removing information which is not required by the profiler instructions 104 to calculate the profile code 107. Depending on the requirements of the profiler instructions 104, data such as images, formatting, and stopwords may be removed which would allow events about to be deleted from the user profile cache to more be compactly retained. The browser cache or user profile cache may also be treated as a separate storage area from the user profile 103 and events as they occur are accessed from the cache, compressed if required, and stored in the user profile 103.

Certain events such as purchases, which might be more easily evaluated at the time of user interaction, may be toted in storage by the use of tags attached to the events. Other events, such as a user drafting an email, involves the user typing significant amounts of text. Such an event may also be detected and appropriately tagged. These types of events may be tagged by an informative tag, such as "purchase" or "text entry", based on the profiler instructions 104 requiring such information to calculate the profile code 107.

These techniques for caching and tagging events postpones some or all of the interpretation of browser interaction events. For example, by visiting an automobile website, the URL's and keywords seen on that site would be stored with appropriate tags if required. Only later is such an event associated with a profile code 107. Calculation of at least one profile code 107 may be scheduled to occur periodically on the client device 101 every specified time period or at a specific time, such as nightly, when the client device 101 may not generally be in use.

It is noted that multiple rules databases may be used, for example, with an identifier, RULESID, specified to identify a unique rules databases. A client device 101 may either request a specific set of rules using the RULESID or the profile management server 110 may change the RULESID for a group of client devices. For example, all client devices using ruleset 1 may be changed to ruleset 3.

Profiler 102 may periodically send a request for profiler instructions 105 to the profile management server 110. In response, the profile management server 110 sends management server response 106, which includes an updated set of profiler instructions 104.

Figure 2:
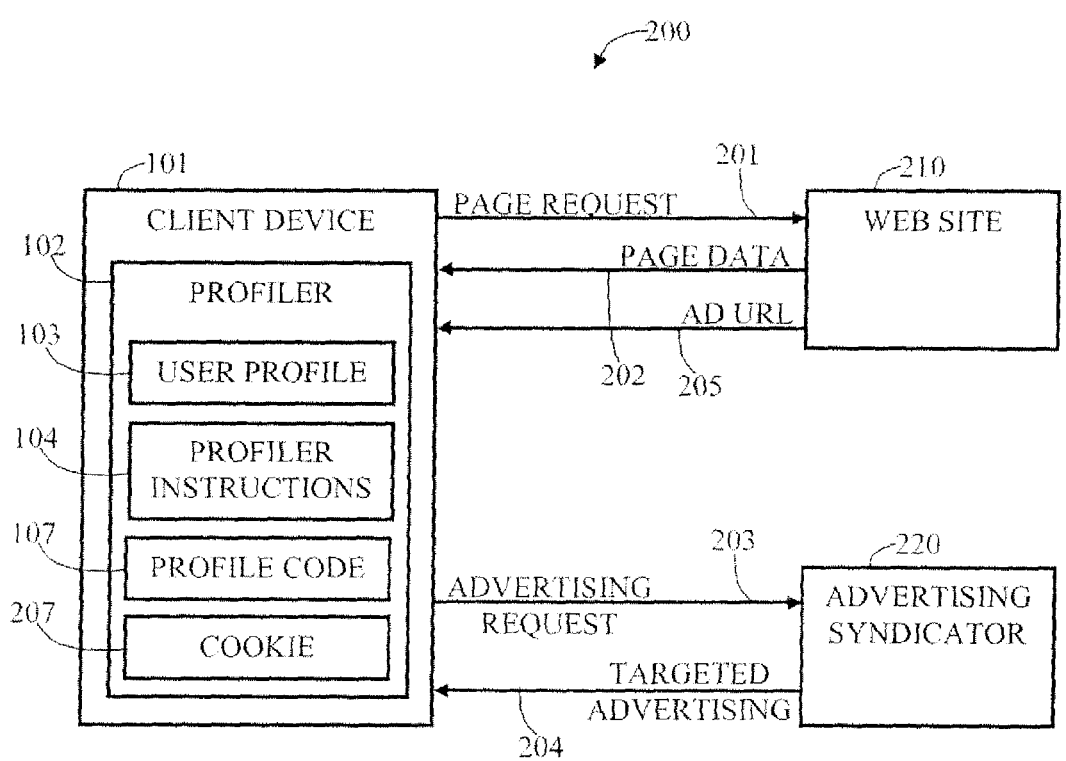
FIG. 2 illustrates a system which is used to illustrate data and work flow in which a profile code is used to obtain target advertisement.

FIG. 2 shows a system 200 which illustrates a data and work flow in which a profile code 107 is sent to a server and used by the server to generate targeted advertising directed to a user accessing a website. The illustrative operation of the data and work flow is as follows. Profiler 102 in client device 101 applies profiler instructions 104 to user profile 103 to generate pro file code 107, which may include the selection of the highest scoring profile code. Next, client device 101 sends page request 201 to website 210. Website 210 sends page data 202 to client device 101 to be displayed as a web page. Page data 202 includes an advertising (AD) URL 205 specifying a source of advertising to be included in the displayed web page. Profiler 102 determines whether the AD URI 205 is an authorized content provider according to rules in profiler instructions 104. If the AD URL 205 is authorized, the profiler 102 sends to advertising syndicator 220 an advertising request 203 generated by combining the profile code 107 with said AD URL 205, or alternatively the profile code 107 is stored in cookie 207 which is made accessible to the advertising syndicator 220. Targeted advertising 204 is returned to the client device 101 for display to the consumer. It is noted that prior to sending the profile code 107 it may be encrypted as part of a secure transfer sequence.

The profile code 107 may be sent in hyper-text transfer protocol (HTTP) headers, such as, pragma, accept, accept-charset, accept-encoding. The profile code 107 may be sent along in the HTTP request as a name/value pair attached to the uniform resource identified (URI) field. For example, a request for http://www.amazon.com turns into http://www.amazon.com?profid=10, where the profid is the profile code 107. The profile code 107 may also be passed as a name/value pair in a cookie for the site domain. A profile code 107 may be generated upon each advertising request 203 or profile codes 107 may be cached and not recalculated for a specified time period.

If the advertising URL 205 is not authorized, profiler 102 sends to advertising syndicator 220 an advertising request 203 which does not include the profile code 107, and the profile code 107 is not stored in a cookie 207 that is made accessible to the advertising syndicator 220. The rest of the process proceeds similarly brat targeted advertising 204 is likely to be less "targeted" because the advertising syndicator 220 doesn't have access to profile code 107 which describes the consumer as a member of a market segment.

Advertising syndicator 220 determines suitable ads based on the profile code 107 and other information said advertising syndicator 220 has available from other sources not herein described. Advertising syndicator 220 sends targeted advertising 204 to client device 101. Client device 101 renders targeted advertising 204 along with page data 702.

It should be noted that while embodiments of the present invention are illustrated in the context of delivering advertising over a web based network, the techniques described herein may be applied to a wider variety of content over a wider variety of networking protocols. Such content may be filtered, personalized, or customized to become targeted content.

The profiler 102 can be utilized to transform multiple types of data about a user, as stored in the user profile 103, into an index represented by a small domain of possible values, for example the integers 0 to 99. Multiple types of data means that the calculation of profile code 107 is based on data in multiple subject areas. This calculation may be distinguished from an accumulator function, which simply counts how many times, a similar incident occurs, for example, how many times apparel websites are visited. For example, if the profiler 102 tracks the number of times the user visits various types of apparel stores, then the profiler instructions 104 would provide rules to distinguish between the apparel website categories. The profiler 102 would then, using rules provided in the profiler instructions 104, analyze these multiple types of data to determine what type of apparel shopper the user is, for example, a children's clothing shopper, a high end business attire shopper, a shopper for budget fashions, or the like.

The smaller the domain of the profile code 107, the coarser the classification of market segments. The coarseness of market segmentation should be coarse enough to alleviate the majority of users' privacy concerns while providing value to content providers. Exemplary content providers are operators of web sites 210, advertising syndicators 220, or other services that deliver customizable content over a digital network. In the previous example, only a single two-digit number is provided to the advertisers. Consequently, the user may feel secure that no personally-identifying data is being revealed to the advertiser. While there are some advertisers who would benefit from finer segmentation than is possible with two-digit numbers, for many advertisers there is immense value even at this level of coarseness. In other embodiments, finer segmentation is possible, such as a profile code 107 domain that contains three-digit integer values.

A descriptive list of market segments or psycho-demographic may be made available to both client and server. The list should have a short enough length, in other words, have a small enough domain, that the client feels reassured of privacy. A client may explicitly select a value for the profile code 107, thus providing a manual override to the profile code 107 automatically generated by profiler 102.

Profile code 107 may evolve over time in response to demands by advertisers and content providers. This evolution would be accomplished by supplying updated profiler instructions 104 with different rules. Content providers such as advertising syndicators 220 would receive an updated list of profile codes 107 and their corresponding marketing segments so they may categorize their targeted content appropriately.

According to an embodiment, a profile code 107 generated for a user is only provided to authorized advertising syndicators 220. There are a variety of possible ways for passing the profile code 107 to the advertising syndicators 220 including, the following.

Profiler 102 may add the profile code 107 to the advertising request 203 used to fetch the targeted advertising 204. For example, a page may embed advertisements by running JavaScript to fill a frame on a webpage. This JavaScript is fetched with a request such as, <script type="text/JavaScript".
  src="http://pagead2.googlesyndication.com/pagead/
    show_ads.js?ProfileCode=33"></script>
Profile code 107 may be stored in a cookie 207 accessible to the advertising syndicator 220.

There are various techniques to determine which content providers are authorized to receive the profile code. For example, profiler instructions 104 may include a list of authorized content providers, such as a list of authorized advertising syndicators 220. Alternatively, the content providers may participate in a challenge-response protocol to ensure that the content provider is authorized to receive the profile code. For example, each authorized advertising syndicator 220 may receive each month a personalized code consisting of the date (AUTHORIZED_DATE) and the domain name (AUTHORIZED_DOMAIN), for example, "adsense.google.com" of the advertising syndicator 220, both encrypted with the private key of the profile management server. The advertising syndicator 220 passes this encrypted domain game and private key to the client who decrypts it with the public key of the profile management server which is included in the profiler instructions, if AUTHORIZED_DATE matches the current date and AUTHORIZED_DOMAIN matches the current domain, the content provider is authorized and the profiler provides the profile code to the content provider.

A part of gaining the user's trust that privacy is preserved is to reveal to the user what data is being shared with others. One embodiment of the present invention displays the non-identifying segment descriptor label or profile code which the profiler is providing to the content provider or the client to the user. By providing full disclosure, the profiler engine reassures the client of privacy because the profile code is incapable of identifying the user beyond a coarse classification to a specific market segment. Said profile code may, for instance, be displayed in a corner of a browser, continuously, when it is provided to a content provider, or only when requested by a user, at the user's option.

Figure 3:
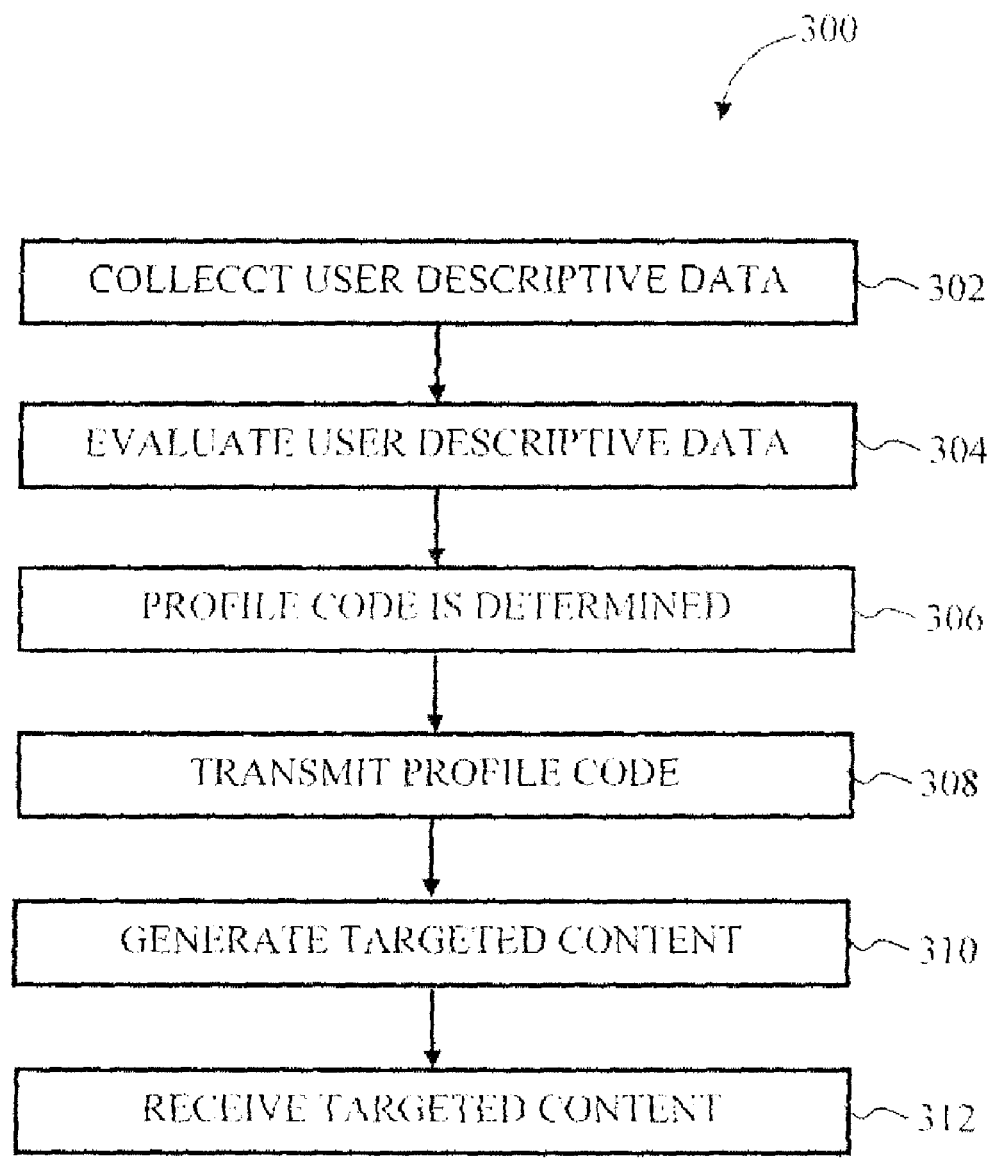
FIG. 3 illustrates an exemplary process in accordance with the present invention.

FIG. 3 shows an exemplary process 300 in accordance with the present invention. Beginning in step 302, user descriptive data is collected by a client, such as client device 101, as the user employs the elicit. In step 304, the user descriptive data is evaluated by the client. In step 306, a profile code is determined. This profile code identifies a market segment while being coarse enough to preserve user privacy. In step 308, the profiler code is transmitted to an advertising, server. In step 310, targeted content is generated based upon the profile code. Finally, in step 312, the targeted content is received back at the client. The present invention reduces the amount of data traffic between a client device and servers and provides a high level of anonymity of user information to preserve user privacy.

Figure 4:
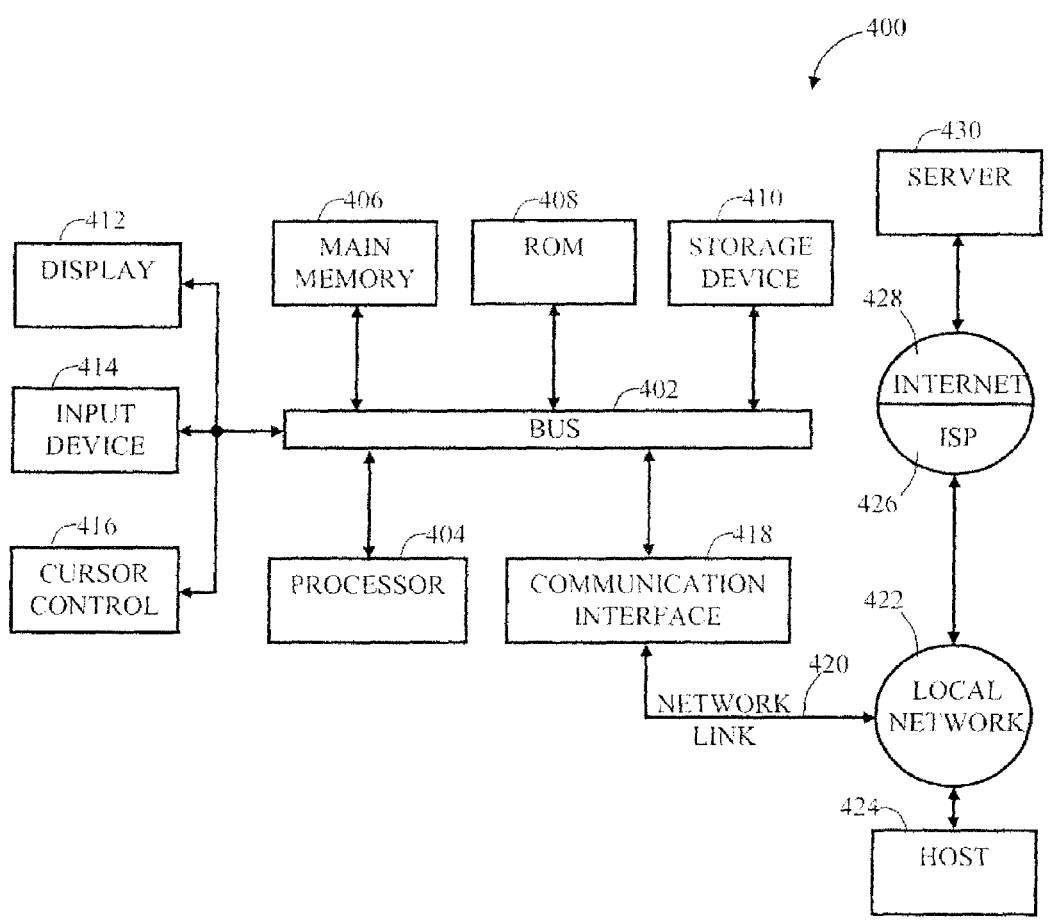
FIG. 4 illustrates a computer system that may be used in an embodiment of the present invention.

FIG. 4 illustrates a computer system 400 which may suitably embody one implementation of the invention. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to the bus 402 for storing information and programs comprising instructions to be executed by processor 404. Main memory 406 also may be used for storing temporary variables, other intermediate information, or a cache of user profile information, for example, during execution of programs by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions such as profiler 102.

Computer system 400 may be coupled via bus 402 to a display 412, such as a cathode ray tube (CRT), liquid crystal display (LCD), or the like, for displaying information to a computer user. An input device 414, including alphanumeric and other keys, is coupled to bus 402 for communicating information and command selections to processor 404. Another type of user input device is a cursor control 416, such as a mouse, a trackball, or cursor direction keys for communicating direction information and command selections to processor 404 and for controlling cursor movement on display 412.

The invention is related to the use of computer system 400 modified as described herein for implementing the techniques described herein. According to one embodiment of the invention, those techniques are performed by computer system 400 in response to processor 404 executing one or more sequences of instructions contained in main memory 406. Such instructions may be read into main memory 406 from another machine readable medium, such as the storage device 410. Execution of the sequences of instructions contained in main memory 406 causes processor 404 to perform the process steps described herein. In alternative embodiments, hard wired circuitry may be used in place of or in combination with software instructions to implement the invention. Thus, embodiments of the invention are not limited to any specific combination of hardware circuitry and software.

The term "machine readable medium" as used herein refers to any medium that participates in providing data that causes a machine to operation in a specific fashion. In an embodiment implemented using computer system 400, various machine readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402.

Common forms of machine readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the Internet 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, or stored in storage device 410, or other nonvolatile storage for later execution. In this manner, computer system 400 nary obtain application program code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

We claim:

1. A method comprising:
    collecting user-descriptive data about a user at a user's personal client device;
    evaluating said user-descriptive data by said user's personal client device;
    based on said evaluation, reducing said user-descriptive data by said user's personal client device to at least one profile code value from a domain of profile code values, each profile code value of said domain of profile code values identifies a market segment for targeted content;
    transmitting said at least one profile code value from the user's personal client device via a network to a server to cause said server to generate targeted content based on said at least one profile code; and
    receiving said targeted content at said user's personal client device.

2. The method of claim 1, wherein said collecting user descriptive data includes at least one of the following:
    recording user browser interactions;
    tracking search terms input by said user for search queries;

storing user demographic data collected by the user; and
tracking purchases made by the user.

3. The method of claim 1, wherein said at least one profile code value is transmitted as part of a request for a web page transmitted by a browser, wherein said request causes the display of data representing said at least one profile code value.

4. The method of claim 1 wherein the domain of profile codes comprises a limited set of classifications wherein the number of classifications is chosen to limit user identification.

5. The method of claim 4 wherein the limited set of classifications is a set of up to 100 classifications.

6. The method of claim 1 wherein the targeted content is advertising.

7. The method of claim 6 wherein the advertising comprises text, audio, visual and other typed of content.

8. The method of claim 1 wherein the evaluating said user-descriptive data comprises:
triggering an event to be tracked based on a set of rules;
weighting the event based on the set of rules; and
storing the weighted event as a member of a group of tracked events associated with a specific profile code value, wherein a plurality of weighted events is associated with each profile code value.

9. The method of claim 8 wherein determining by said user's personal client device at least one profile code value comprises:
summing the plurality of weighted events associated with each profile code value to provide a summed event weighting factor for each profile code value; and
choosing the at least one profile code value corresponding to the group of tracked events with the highest summed event weighting factor.

10. The method of claim 8 wherein the weighting comprises a weighting factor decay rate which divides the weighting factor by a specified factor every specified time period.

11. The method of claim 1 wherein the at least one profile code value is selected independently of said evaluation.

12. The method of claim 1 wherein the at least one profile code value is displayed on the user's personal client device in human readable form.

13. The method of claim 1 wherein the evaluating said user descriptive data is accomplished through the use of custom conditions constructed by mathematical operators available with a computer language interpreter.

14. A non-transitory machine-readable storage medium carrying a sequence of instructions which, when executed by at least one processor on a user's personal client device, causes the at least one processor to perform steps comprising:
evaluating user-descriptive data;
based on said evaluation, reducing said user-descriptive data to at least one profile code value from a domain of profile code values, each profile code value of said domain of profile code values identifies a market segment for targeted content;
transmitting via a network to a server from a set of servers said at least one profile code value to cause said server to generate targeted content based on said at least one profile code value; and
receiving said targeted content.

15. The non-transitory machine-readable storage medium of claim 14, wherein said user descriptive data is generated by one of the following:
recording user browser interactions;
tracking search terms input by said user for search queries;
storing user demographic data collected by the user; and
tracking purchases made by the user.

16. The non-transitory machine-readable storage medium of claim 14, wherein said profile code is transmitted as part of a request for a web page transmitted by a browser running on the user's personal client device, wherein said request causes the display of data representing said profile code.

17. The non-transitory machine-readable storage medium of claim 14 further comprises a set of rules for guiding the client evaluating user-descriptive data.

18. A method comprising:
collecting user-descriptive data about a user at a user's personal client device;
evaluating said user-descriptive data by said user's personal client device;
based on said evaluation, reducing said user-descriptive data by said user's personal client device to at least one profile code value from a domain of profile code values, each profile code value of said domain of profile code values identifies a marketing segment for targeted content;
transmitting from said user's personal client device via a network to an authorized server from a set of servers said at least one profile code value;
in response to said at least one profile code value, said authorized server generating targeted content based on said at least one profile code value; and
receiving said targeted content at said user's personal client device.

19. The method of claim 18 further comprises:
storing said user-descriptive data at the user's personal client device for latter evaluation.

20. The method of claim 18 further comprises:
evaluating said user-descriptive data based on one set of rules selected from a grouping of multiple sets of rules.

* * * * *